United States Patent
Yuzawa et al.

(10) Patent No.: US 11,534,846 B2
(45) Date of Patent: Dec. 27, 2022

(54) WIRE ELECTRICAL DISCHARGE MACHINE

(71) Applicant: Mitsubishi Electric Corporation, Tokyo (JP)

(72) Inventors: Takashi Yuzawa, Tokyo (JP); Yoichi Otomo, Tokyo (JP); Junichi Shibata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 29 days.

(21) Appl. No.: 17/432,517

(22) PCT Filed: Apr. 5, 2019

(86) PCT No.: PCT/JP2019/015207
§ 371 (c)(1),
(2) Date: Aug. 20, 2021

(87) PCT Pub. No.: WO2020/202570
PCT Pub. Date: Oct. 8, 2020

(65) Prior Publication Data
US 2022/0143724 A1    May 12, 2022

(51) Int. Cl.
*B23H 7/10* (2006.01)
*B23H 1/00* (2006.01)
*B23H 11/00* (2006.01)

(52) U.S. Cl.
CPC ........... *B23H 7/105* (2013.01); *B23H 1/00* (2013.01); *B23H 11/003* (2013.01); *B23H 2500/20* (2013.01)

(58) Field of Classification Search
CPC ......... B23H 1/00; B23H 1/028; B23H 1/003; B23H 7/02; B23H 11/003; B23H 7/105; B23H 2500/20; B28D 5/0082
See application file for complete search history.

(56) References Cited

U.S. PATENT DOCUMENTS 4,547,646 A * 10/1985 Briffod ............... B23H 11/003
83/167
5,854,459 A * 12/1998 Buhler ..................... B23H 7/02
219/69.12

(Continued)

FOREIGN PATENT DOCUMENTS

JP    61-173814 A    8/1986
JP    10-217036 A    8/1998

(Continued)

OTHER PUBLICATIONS

German Office Action dated Nov. 3, 2021 in German Application No. 11 2019 006 966.7.

(Continued)

*Primary Examiner* — Dana Ross
*Assistant Examiner* — Joe E Mills, Jr.
(74) *Attorney, Agent, or Firm* — Xsensus LLP

(57) ABSTRACT

A wire electrical discharge machine to cut a workpiece by generating an electrical discharge in a dielectric working fluid between wire electrodes arranged in parallel and the workpiece includes: a work tank that stores the dielectric working fluid; a Z-axis stage that is disposed in a lower portion of the work tank and moves the workpiece in a Z-axis direction that is a vertical direction; a pillar that extends upward from the Z-axis stage and has an upper end portion located above the highest level of a fluid level of the dielectric working fluid in the work tank; an adjuster that is installed downward from a portion of the pillar located above the highest level of the fluid level, is disposed above the highest level of the fluid level, and adjusts the position or posture of the workpiece in a direction other than the vertical direction.

9 Claims, 7 Drawing Sheets

(56) References Cited

U.S. PATENT DOCUMENTS

| | | | |
|---|---|---|---|
| 6,006,737 A | 12/1999 | Hayashi et al. | |
| 2016/0059338 A1* | 3/2016 | Miyake | B23H 7/02 |
| | | | 219/69.12 |

FOREIGN PATENT DOCUMENTS

| | | |
|---|---|---|
| JP | 2002-337137 A | 11/2002 |
| JP | 2013-158893 A | 8/2013 |
| JP | 2013-258243 A | 12/2013 |

OTHER PUBLICATIONS

International Search Report and Written Opinion dated Jun. 25, 2019, received for PCT Application PCT/JP2019/015207, Filed on Apr. 5, 2019, 7 pages including English Translation.
Decision to Grant dated Dec. 17, 2019, received for JP Application 2019-553125, 5 pages including English Translation.

* cited by examiner

WIRE ELECTRICAL DISCHARGE MACHINE

CROSS-REFERENCE TO RELATED APPLICATION

The present application is based on PCT filing PCT/JP2019/015207, filed Apr. 05, 2019, the entire contents of which are incorporated herein by reference.

FIELD

The present invention relates to a wire electrical discharge machine that cuts a workpiece into a plurality of pieces at a time by generating an electrical discharge between a plurality of wire electrodes stretched in parallel and the workpiece.

BACKGROUND

In a wire electrical discharge machine that cuts a workpiece into a plurality of pieces at a time by generating an electrical discharge in a dielectric working fluid between wire electrodes stretched in parallel and the workpiece, an adjuster that moves the workpiece in a direction other than a vertical direction or an adjuster that changes the posture of the workpiece is included in order to cut the workpiece in a specified crystal orientation. Hereinafter, both are collectively referred to as an adjuster.

The workpiece needs to be immersed in a work tank filled with the dielectric working fluid, and the adjuster also needs to be immersed in the dielectric working fluid. However, in the case where the adjuster is immersed in the dielectric working fluid, it is difficult to make only a movable portion a waterproof structure so that the entire adjuster needs to have a waterproof structure. Making the entire complicated adjuster a waterproof structure is difficult and leads to an increase in cost. Note that even if the adjuster is made of a rustproof material such as stainless steel, surface oxidation, electrolytic corrosion, and adhesion of rust cannot be avoided under the environment in which the adjuster is immersed in the dielectric working fluid, so that durability thereof is reduced. Therefore, the problems such as the increase in cost and the reduction in durability occur in the case where the adjuster is immersed in the dielectric working fluid.

Patent Literature 1 discloses a wire saw in which a workpiece is attached to a lower portion of a workpiece supporting mechanism, a working fluid is supplied onto a wire while the wire is caused to run, and in this state, the workpiece is cut by being pressed against and brought into contact with the wire by the workpiece supporting mechanism. When the mechanism disclosed in Patent Literature 1 is applied to the wire electrical discharge machine, the adjustment mechanism can be disposed outside the work tank and thus need not have a waterproof structure.

CITATION LIST

Patent Literature

Patent Literature 1: Japanese Patent Application Laid-open No. 2002-337137

SUMMARY

TECHNICAL PROBLEM

In a case where a Z-axis mover that moves the workpiece in the vertical direction is of a column type as in Patent Literature 1, the Z-axis mover cannot be disposed in the work tank because it is difficult to make the Z-axis mover a waterproof structure, so that the Z-axis mover has to be disposed outside the work tank. However, the size of the work tank depends on the sizes of various structural parts required for electrical discharge machining, such as guide rollers disposed in the work tank. Therefore, even if the Z-axis mover is disposed outside the work tank, the work tank cannot be simply reduced in size but needs to have a certain size or larger. For this reason, when the invention disclosed in Patent Literature 1 is applied to the wire electrical discharge machine, the Z-axis mover is disposed outside the work tank, which increases the size of the entire device. Therefore, even when the invention disclosed in Patent Literature 1 is applied to the wire electrical discharge machine, it has been unable to implement a wire electrical discharge machine that does not require the adjuster to have a waterproof structure and suppresses an increase in size.

The present invention has been made in view of the above, and an object of the present invention is to provide a wire electrical discharge machine that does not require an adjuster to have a waterproof structure and suppresses an increase in size of a machine.

SOLUTION TO PROBLEM

In order to solve the above problem and achieve the object, the present invention is a wire electrical discharge machine that cuts a workpiece by generating an electrical discharge in a dielectric working fluid between wire electrodes arranged in parallel and the workpiece, the wire electrical discharge machine including: a cutting wire in which the wire electrodes are stretched in parallel around a plurality of guide rollers and arranged in parallel; a work tank that stores the dielectric working fluid; a Z-axis mover that is disposed in a lower portion of the work tank and moves the workpiece in a Z-axis direction that is a vertical direction; and a pillar that extends upward from the Z-axis mover and has an upper end portion located above the highest level of a fluid level of the dielectric working fluid in the work tank. The present invention further includes: at least one adjuster that is installed downward from a portion of the pillar located above the highest level of the fluid level, is disposed above the highest level of the fluid level, and adjusts the position or posture of the workpiece in a direction other than the vertical direction; and a suspender that is hung from the adjuster and holds the workpiece.

ADVANTAGEOUS EFFECTS OF INVENTION

The wire electrical discharge machine according to the present invention has an effect that the adjuster need not have a waterproof structure, and an increase in size of the device can be suppressed.

DESCRIPTION OF EMBODIMENT

A wire electrical discharge machine according to an embodiment of the present invention will now be described in detail with reference to the drawings. Note that the present invention is not limited to the embodiment.

FIRST EMBODIMENT

Figure 1:
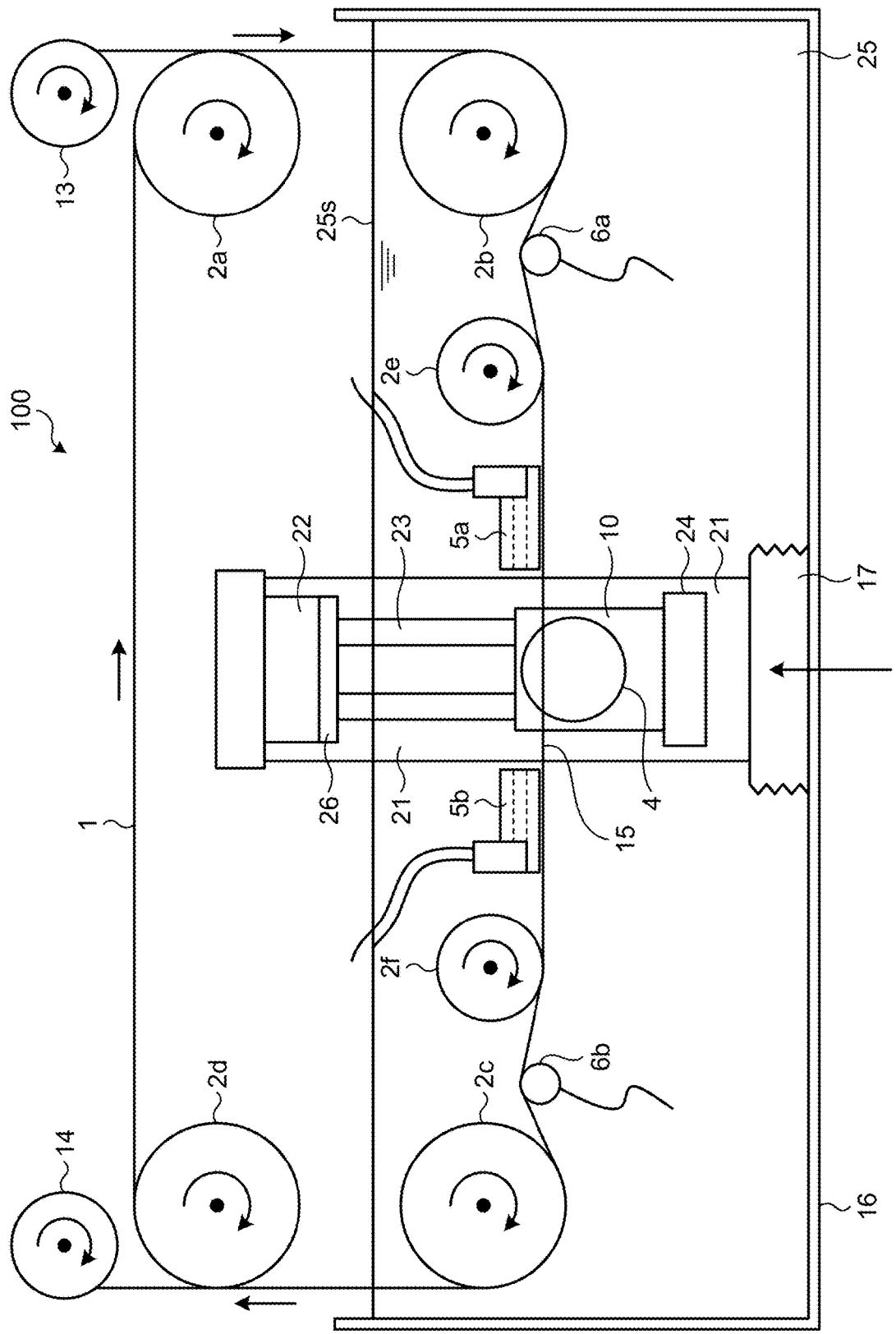
FIG. 1 is a diagram illustrating a configuration of a wire electrical discharge machine according to a first embodiment of the present invention.
Figure 2:
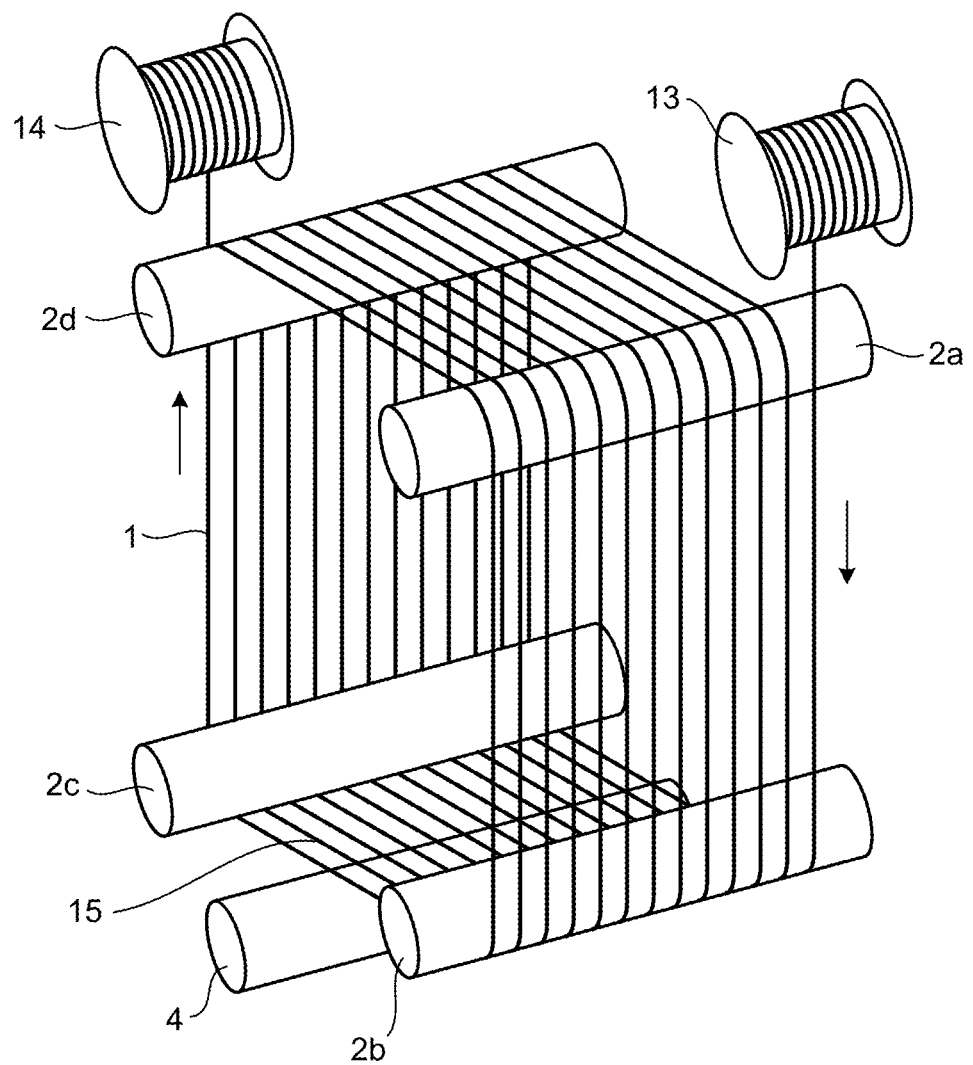
FIG. 2 is a perspective view illustrating a cutting wire of the wire electrical discharge machine according to the first embodiment.
Figure 3:
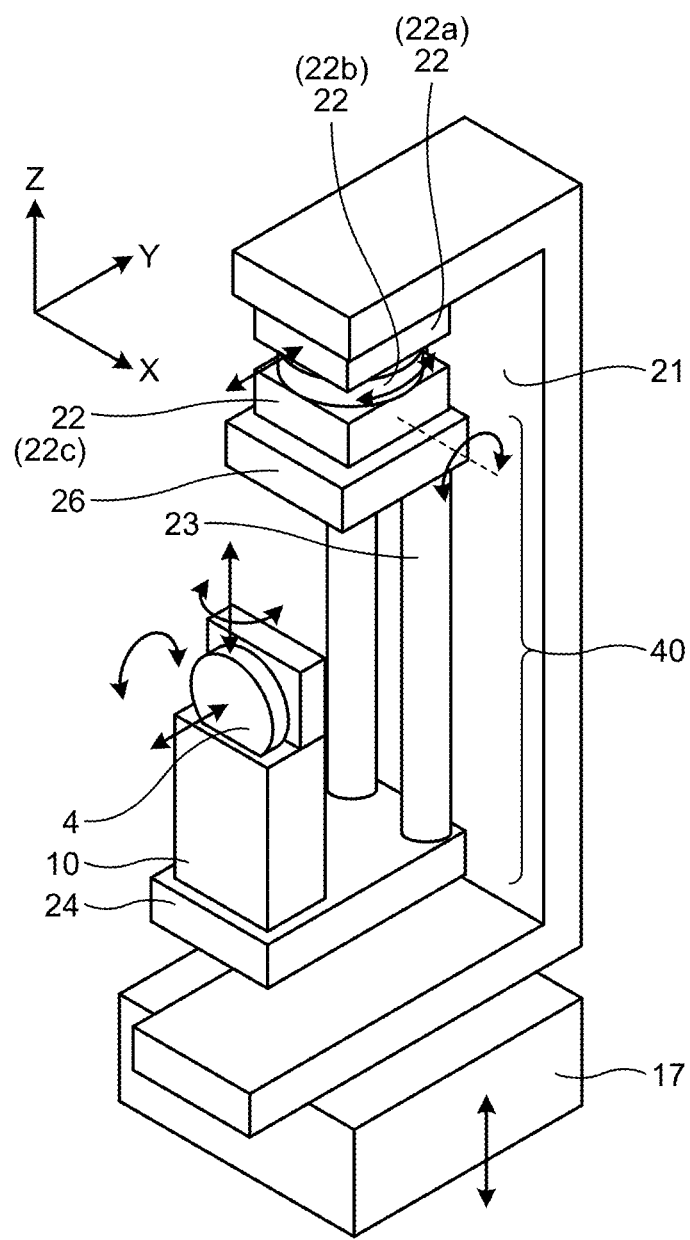
FIG. 3 is an enlarged view of an adjuster of the wire electrical discharge machine according to the first embodiment.

FIG. 1 is a diagram illustrating a configuration of a wire electrical discharge machine according to a first embodiment of the present invention. FIG. 2 is a perspective view illustrating a cutting wire of the wire electrical discharge machine according to the first embodiment. FIG. 3 is an enlarged view of an adjuster of the wire electrical discharge machine according to the first embodiment. A wire electrical discharge machine 100 according to the first embodiment includes: a wire feeding bobbin 13 that feeds wire electrodes 1; a wire take-up bobbin 14 that takes up the wire electrodes 1; guide rollers 2a, 2b, 2c, and 2d for allowing the wire electrodes 1 to run; a pair of dielectric working fluid nozzles 5a and 5b that injects a dielectric working fluid 25 supplied from a dielectric working fluid supply device (not illustrated) toward a workpiece 4; power feed contacts 6a and 6b that contact the wire electrodes 1; and a workpiece holding tool 10 that holds the workpiece 4. Note that the wire electrical discharge machine 100 has a rectangular coordinate system in which a vertical direction is a Z-axis direction, and two directions orthogonal to each other in a horizontal plane are an X-axis direction and a Y-axis direction.

The four guide rollers 2a, 2b, 2c, and 2d are spaced apart from one another in parallel in an axial direction. The wire electrode 1 fed out from the wire feeding bobbin 13 is wound a plurality of times around the guide rollers 2a, 2b, 2c, and 2d at intervals, and then taken up by the wire take-up bobbin 14. Here, a portion of the wire electrodes 1 stretched in parallel between the guide roller 2b and the guide roller 2c serves as a cutting wire 15.

The positional relationship of the workpiece 4 with the cutting wire 15 is changed relatively thereto by a position controller (not illustrated). Therefore, the workpiece 4 is cut by moving the workpiece 4 close to the cutting wire 15 by the position controller (not illustrated). In addition, since an electrical discharge needs to be generated properly at the time of machining, the distance between the workpiece 4 and the cutting wire 15 is controlled to be kept at a constant distance.

The cutting wire 15 is disposed in the dielectric working fluid 25 in a work tank 16, and electrical discharge machining is performed in the dielectric working fluid 25.

A Z-axis stage 17, which is a Z-axis mover for moving the workpiece 4 in the vertical direction, is disposed at a lower portion of the work tank 16. The Z-axis stage 17 is provided with a bellows in an expansion/contraction portion, and has a waterproof structure. A pillar 21 extends upward from the Z-axis stage 17. The pillar 21 has a shape with high rigidity in order to avoid displacement due to an external load. An upper end portion of the pillar 21 is located above the highest level of a fluid level 25s of the dielectric working fluid 25 in the work tank 16. Therefore, even in a state in which the dielectric working fluid 25 is filled in the work tank 16 up to the highest level of the fluid level 25s, the upper end portion of the pillar 21 is in the air without being immersed in the dielectric working fluid 25. At least one adjuster 22 is provided in a portion of the pillar 21 located above the highest level of the fluid level 25s of the dielectric working fluid 25. The adjuster 22 is a mechanism that adjusts the position or posture of the workpiece 4 in a direction other than the vertical direction. The adjuster 22 is installed downward from the portion of the pillar 21 located above the highest level of the fluid level 25s of the dielectric working fluid 25, and is disposed above the highest level of the fluid level 25s of the dielectric working fluid 25. The wire electrical discharge machine 100 according to the first embodiment includes a Y-axis mover 22a, a Z-axis rotor 22b, and an X-axis rotor 22c as the adjuster 22. The Y-axis mover 22a is a mechanism that changes the position of the workpiece 4 by moving the workpiece 4 in the Y-axis direction. The Z-axis rotor 22b is a mechanism that changes the posture of the workpiece 4 by rotating the workpiece 4 about the Z-axis. The X-axis rotor 22c is a mechanism that changes the posture of the workpiece 4 by rotating the workpiece 4 about the X-axis.

On a lower side of the adjuster 22, a suspender 40 that is hung from the adjuster 22 and holds the workpiece 4 is installed. The suspender 40 includes: a base plate 26 that is installed on a side opposite to the portion of the pillar 21 located above the highest level of the fluid level 25s of the dielectric working fluid 25 with the adjuster 22 interposed therebetween; a workpiece holding tool 10 that holds the workpiece 4; a holding tool mounting stage 24 to which the workpiece holding tool 10 is installed; and a coupler 23 that extends downward from the base plate 26 and has the holding tool mounting stage 24 installed at a lower end portion thereof. The coupler 23 suspends and holds the workpiece holding tool 10 in the dielectric working fluid 25 in the work tank 16. The coupler 23 includes a plurality of structures each having the shape of a round bar. The coupler 23 has the shape of a round bar to be able to suppress the influence of a flow of the dielectric working fluid 25 in the work tank 16. That is, when the flow of the dielectric working fluid 25 supplied to the workpiece 4 during machining hits the coupler 23, the load applied to the coupler 23 can be reduced so that a deterioration in machining accuracy due to displacement of the coupler 23 can be prevented. Note that the suspender 40 need only be hung from the adjuster 22 to hold the workpiece 4, and is not limited to the structure exemplified above.

The use of the adjuster 22 allows the workpiece 4 to be moved in the Y-axis direction, rotated about the Z-axis, and rotated about the X-axis via the suspender 40.

A voltage is applied to the wire electrodes 1 via the power feed contacts 6a and 6b. In order to appropriately remove machining waste discharged from the workpiece 4 at the time of machining and to cool a portion between the electrodes, the dielectric working fluid 25 is supplied between the electrodes through the dielectric working fluid nozzles 5a and 5b. The wire position is restrained by positioning guide rollers 2e and 2f such that the machining accuracy does not deteriorate by vibration of the wire electrodes 1 during machining.

Figure 4:
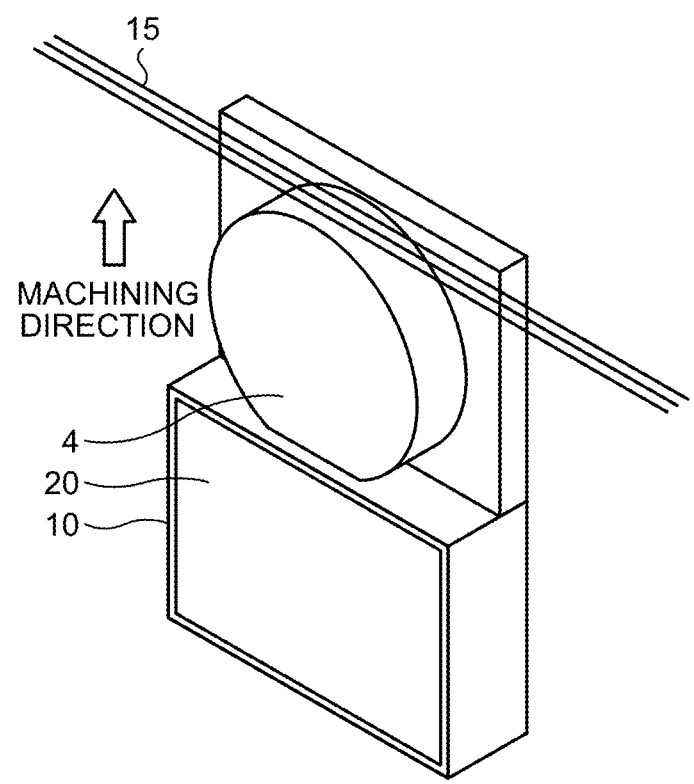
FIG. 4 is a diagram illustrating a positional relationship between the cutting wire and a workpiece in the wire electrical discharge machine according to the first embodiment.
Figure 5:
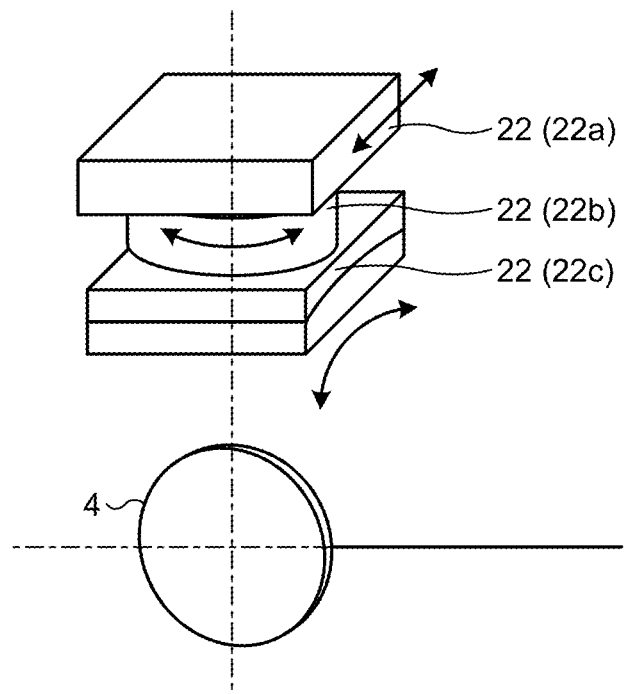
FIG. 5 is a diagram illustrating an example of a configuration of the adjuster of the wire electrical discharge machine according to the first embodiment.

FIG. 4 is a diagram illustrating a positional relationship between the cutting wire and the workpiece in the wire electrical discharge machine according to the first embodiment. FIG. 5 is a diagram illustrating an example of a configuration of the adjuster of the wire electrical discharge machine according to the first embodiment. When the workpiece 4 is cut by the cutting wire 15 in which the wire electrodes 1 are stretched in parallel, the posture of the workpiece 4 needs to be adjusted before machining with reference to a reference plane 20 of the workpiece holding tool 10, in order for the wire electrodes 1 to cut the workpiece 4 at specific position and angle. The adjuster 22 installed in the portion of the pillar 21 located above the highest level of the fluid level 25s of the dielectric working fluid 25 can adjust the position and posture with respect to three axes by Y-axis movement, Z-axis rotation, and X-axis rotation. By combining the Y-axis movement, the Z-axis rotation, and the X-axis rotation, the position and posture of the workpiece 4 can be adjusted with reference to the reference plane 20. After the adjustment of the position and posture of the workpiece 4 is completed, a cutting operation is performed.

In the case of a wire electrical discharge machine in which the adjuster is disposed directly on the Z-axis stage, the adjuster is immersed in the dielectric working fluid. On the other hand, as illustrated in FIG. 1, in the wire electrical discharge machine 100 according to the first embodiment, the adjuster 22 is disposed above the fluid level 25s of the dielectric working fluid 25 via the pillar 21, so that the adjuster 22 is not immersed in the dielectric working fluid 25 even in a state in which the workpiece 4 is in the fluid.

Note that the Z-axis stage 17 is a simple operation mechanism in the vertical direction and thus can easily be made into a waterproof mechanism by providing the bellows in the expansion/contraction portion. On the other hand, the adjuster 22 is a complicated mechanism, and it is difficult to make the adjuster 22 a waterproof mechanism in terms of cost and maintenance of accuracy. A method has also been attempted in which the Z-axis stage is disposed outside the work tank so that the size of the work tank is reduced accordingly. However, as illustrated in FIGS. 1 and 2, various structural components necessary for electrical discharge machining, such as the guide rollers 2b and 2c, the power feed contacts 6a and 6b, and the dielectric working fluid nozzles 5a and 5b, are disposed in the work tank 16. Even if the Z-axis stage is disposed outside the work tank 16, the various structural components necessary for electrical discharge machining need to be disposed in a similar manner as FIGS. 1 and 2 so that it is difficult to reduce the size of the work tank 16. That is, when the Z-axis stage is disposed outside the work tank 16, an increase in size of the entire device cannot be avoided.

When the wire electrical discharge machine 100 according to the first embodiment performs slicing by moving the workpiece 4 in the Z-axis direction, the apparatus can achieve high-quality positioning adjustment over a long period of time because the adjuster 22 is disposed at the position not immersed in the dielectric working fluid 25. In addition, since the adjuster 22 is not immersed in the dielectric working fluid 25, no special waterproof measure is required, and the cost can be reduced. Moreover, since the Z-axis stage 17 is disposed in the lower portion of the work tank 16, the entire device can be reduced in size.

Figure 6:
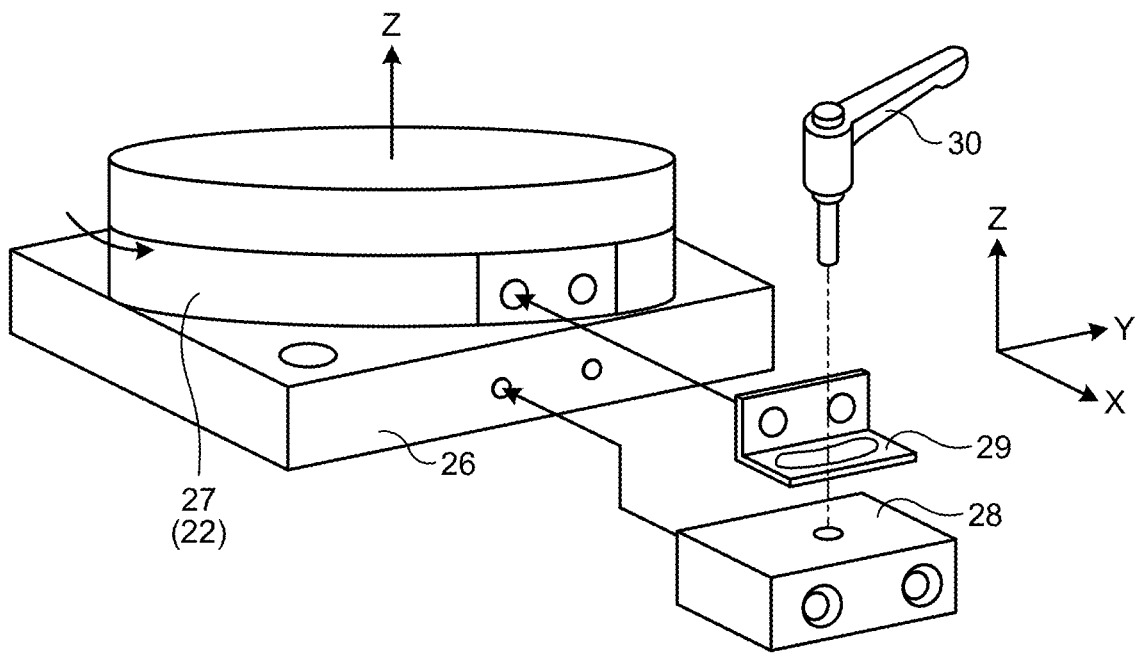
FIG. 6 is an exploded perspective view of a fixer between the adjuster and a base plate of the wire electrical discharge machine according to the first embodiment.
Figure 7:
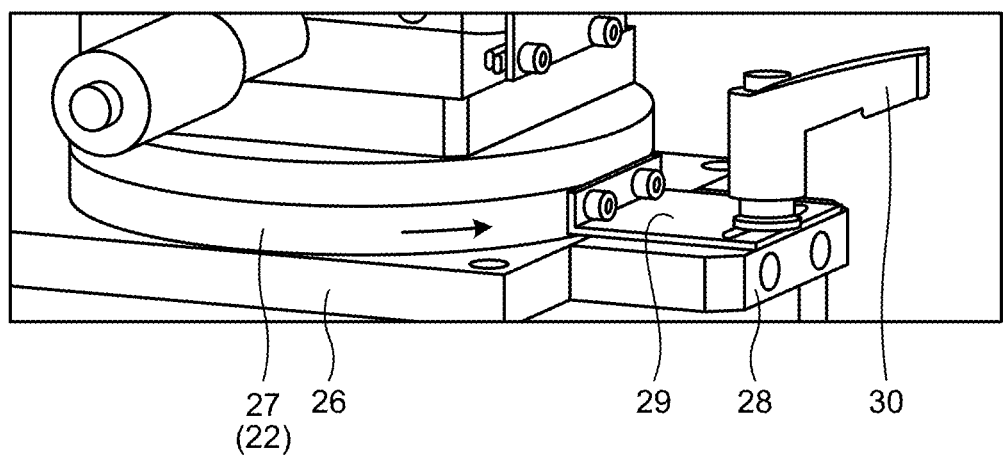
FIG. 7 is a perspective view of the fixer between the adjuster and the base plate of the wire electrical discharge machine according to the first embodiment.

FIG. 6 is an exploded perspective view of a fixer between the adjuster and the base plate of the wire electrical discharge machine according to the first embodiment. FIG. 7 is a perspective view of the fixer between the adjuster and the base plate of the wire electrical discharge machine according to the first embodiment. In a structure in which a rotating structure portion 27 is installed on the base plate 26, a fixing block 28 is connected to the base plate 26, and a disk plate 29 is connected to the rotating structure portion 27 forming a part of the adjuster 22. The fixing block 28 and the disk plate 29 are fixed via a clamp lever 30. The adjuster 22 is provided with a fixer that fixes the adjustment position, thereby being able to prevent a change in position or posture of the workpiece 4 due to an external load applied thereto.

Note that the fixer that fixes the adjustment position of the adjuster 22 may have a structure in which a member attached to the fixing block 28 and a member attached to the rotating structure portion 27 are sandwiched and fixed.

The wire electrical discharge machine 100 according to the first embodiment brings the fixing block 28 and the disk plate 29 into surface contact with each other, thereby being able to prevent positional displacement between the base plate 26 and the rotating structure portion 27. This can prevent deterioration in the machining accuracy due to an external load.

Note that in the above description, the adjuster 22 includes the Y-axis mover 22a, the Z-axis rotor 22b, and the X-axis rotor 22c, but the adjuster 22 can be selected from one or more of an X-axis mover, the Y-axis mover 22a, the X-axis rotor 22c, a Y-axis rotor, and the Z-axis rotor 22b. When the adjuster 22 includes all of the X-axis mover, the Y-axis mover 22a, the X-axis rotor 22c, the Y-axis rotor, and the Z-axis rotor 22b, the wire electrical discharge machine 100 can perform position adjustment in the XY-axis direction and also in the direction of rotation of each axis. Note that since the Z-axis movement can be handled by a drive shaft of the Z-axis stage 17, the adjuster 22 need not be provided with a Z-axis mover. The wire electrical discharge machine 100 can perform the position adjustment in any direction by a combination of adjustment axes.

Figure 8:
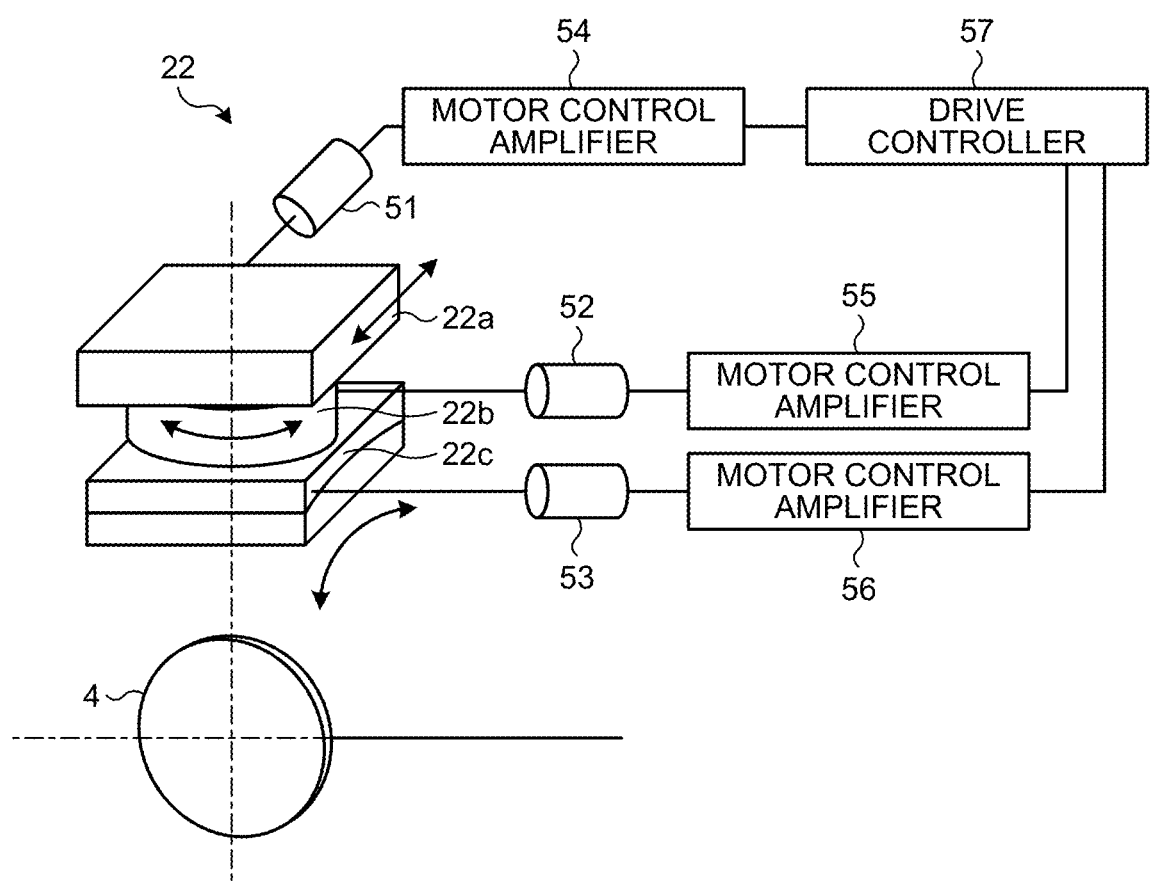
FIG. 8 is a diagram illustrating a variation of the adjuster of the wire electrical discharge machine according to the first embodiment.

FIG. 8 is a diagram illustrating a variation of the adjuster of the wire electrical discharge machine according to the first embodiment. The adjuster 22 according to the variation includes a Y-axis mover drive motor 51, a Z-axis rotor drive motor 52, an X-axis rotor drive motor 53, motor control amplifiers 54, 55, and 56, and a drive controller 57. The addition of the Y-axis mover drive motor 51, the Z-axis rotor drive motor 52, the X-axis rotor drive motor 53, the motor control amplifiers 54, 55, and 56, and the drive controller 57 to the adjuster 22 enables position control and angle control based on a preset program. That is, the drive controller 57 performs the position control and angle control on the basis of the preset program by controlling the Y-axis mover drive motor 51, the Z-axis rotor drive motor 52, and the X-axis rotor drive motor 53 via the motor control amplifiers 54, 55, and 56, whereby the work of adjusting the position and posture of the workpiece 4 can be automated.

The configuration illustrated in the above embodiment merely illustrates an example of the content of the present invention, and can thus be combined with another known technique or partially omitted and/or modified without departing from the scope of the present invention.

REFERENCE SIGNS LIST 1 wire electrode; 2a, 2b, 2c, 2d guide roller; 2e, 2f positioning guide roller; 4 workpiece; 5a, 5b dielectric working fluid nozzle; 6a, 6b power feed contact; 10 workpiece holding tool; 13 wire feeding bobbin; 14 wire take-up bobbin; 15 cutting wire; 16 work tank; 17 Z-axis stage; 20 reference plane; 21 pillar; 22 adjuster; 22a Y-axis mover; 22b Z-axis rotor; 22c X-axis rotor; 23 coupler; 24 holding tool mounting stage; 25 dielectric working fluid; 25s fluid level; 26 base plate; rotating structure portion; 28 fixing block; 29 disk plate; 30 clamp lever; 40 suspender; 51 Y-axis mover drive motor; 52 Z-axis rotor drive motor; 53 X-axis rotor drive motor; 54, 55, 56 motor control amplifier; 57 drive controller; 100 wire electrical discharge machine.

The invention claimed is:

1. A wire electrical discharge machine to cut a workpiece by generating an electrical discharge in a dielectric working fluid between wire electrodes arranged in parallel and the workpiece, the wire electrical discharge machine comprising:
   a cutting wire which is a portion of the wire electrodes that are stretched in parallel around a plurality of guide rollers and arranged in parallel;
   a work tank to store the dielectric working fluid;
   a Z-axis mover that is disposed in a lower portion of the work tank to move the workpiece in a Z-axis direction that is a vertical direction;
   a pillar that extends upward from the Z-axis mover and has an upper end portion located above a highest level of a fluid level of the dielectric working fluid in the work tank;
   at least one adjuster that is installed downward from a portion of the pillar located above the highest level of the fluid level and is disposed above the highest level of the fluid level to adjust a position or posture of the workpiece in a direction other than the vertical direction; and
   a suspender that is hung from the adjuster to hold the workpiece.

2. The wire electrical discharge machine according to claim 1, wherein
   the suspender includes:
   a base plate that is installed on a side opposite to the portion of the pillar located above the highest level of the fluid level with the adjuster being interposed between the portion of the pillar located above the highest level of the fluid level and the base plate;
   a workpiece holding tool to hold the workpiece;
   a holding tool mounting stage to which the workpiece holding tool is installed; and
   a coupler that extends downward from the base plate and has the holding tool mounting stage installed at a lower end portion.

3. The wire electrical discharge machine according to claim 2, wherein the coupler has a shape of a round bar.

4. The wire electrical discharge machine according to claim 1, further comprising:
   a drive motor to drive the adjuster; and
   a drive controller to control the drive motor.

5. The wire electrical discharge machine according to claim 1, wherein the adjuster includes at least one of:
   an X-axis mover;
   a Y-axis mover;
   an X-axis rotor;
   a Y-axis rotor; and
   a Z-axis rotor, in a rectangular coordinate system of an X-axis, a Y-axis, and the Z-axis, the X-axis and the Y-axis being orthogonal to each other in a horizontal plane.

6. The wire electrical discharge machine according to claim 1, further comprising a fixer including a clamp lever and configured to fix an adjustment position of the adjuster.

7. The wire electrical discharge machine according to claim 1, wherein the Z-axis mover includes a bellows in an expansion/contraction portion, and is made waterproof.

8. The wire electrical discharge machine according to claim 1, wherein the Z-axis mover is disposed entirely above a lowest inner surface of the work tank.

9. The wire electrical discharge machine according to claim 1, wherein the Z-axis mover is disposed entirely within the work tank.

\* \* \* \* \*